United States Patent
Zhang et al.

(10) Patent No.: US 10,275,252 B2
(45) Date of Patent: Apr. 30, 2019

(54) METHODS FOR EXECUTING A COMPUTER INSTRUCTION AND APPARATUSES USING THE SAME

(71) Applicant: VIA Alliance Semiconductor Co., Ltd., Shanghai (CN)

(72) Inventors: Zhi Zhang, Beijing (CN); Jing Chen, Beijing (CN)

(73) Assignee: VIA ALLIANCE SEMICONDUCTOR CO., LTD., Shanghai (CN)

( * ) Notice: Subject to any disclaimer, the term of this patent is extended or adjusted under 35 U.S.C. 154(b) by 144 days.

(21) Appl. No.: 15/403,524

(22) Filed: Jan. 11, 2017

(65) Prior Publication Data

US 2018/0150295 A1 May 31, 2018

(30) Foreign Application Priority Data

Nov. 30, 2016 (CN) .......................... 2016 1 1081150

(51) Int. Cl.
  *G06F 9/30* (2018.01)
  *G06F 9/32* (2018.01)
  *G06F 9/345* (2018.01)

(52) U.S. Cl.
  CPC .......... *G06F 9/3016* (2013.01); *G06F 9/3001* (2013.01); *G06F 9/3004* (2013.01); *G06F 9/30036* (2013.01); *G06F 9/32* (2013.01); *G06F 9/345* (2013.01)

(58) Field of Classification Search
  None
  See application file for complete search history.

(56) References Cited

U.S. PATENT DOCUMENTS

| | | | | |
|---|---|---|---|---|
| 3,828,175 A * | 8/1974 | Amdahl | ................ | G06F 7/535 708/654 |
| 5,012,438 A * | 4/1991 | Yamaguchi | ............. | G06F 1/035 708/654 |
| 5,278,782 A * | 1/1994 | Nakano | ................ | G06F 7/5525 708/500 |
| 5,515,308 A * | 5/1996 | Karp | ...................... | G06F 7/535 708/500 |
| 5,537,345 A * | 7/1996 | Nakano | ................ | G06F 1/035 708/500 |
| 6,175,907 B1 * | 1/2001 | Elliott | ................. | G06F 9/30014 708/500 |
| 6,226,737 B1 * | 5/2001 | Elliott | .................... | G06F 7/523 708/501 |
| 6,349,319 B1 * | 2/2002 | Shankar | ............... | G06F 7/5525 708/500 |
| 7,031,996 B2 * | 4/2006 | Naik | ..................... | G06F 7/5525 708/605 |

(Continued)

*Primary Examiner* — Eric Coleman
(74) *Attorney, Agent, or Firm* — McClrue, Qualey & Rodack, LLP (57) ABSTRACT

The invention introduces a method for executing a computer instruction, which contains at least the following steps: decoding the computer instruction to generate a micro-instruction at least containing an opcode (operation code) and a packed operand, where the packed operand contains all n input parameters corresponding to the computer instruction; generating n addresses of the n input parameters according to the opcode and the packed operand; and reading n approximations corresponding to the n addresses from a lookup table.

20 Claims, 6 Drawing Sheets

(56) References Cited

U.S. PATENT DOCUMENTS

| | | | | |
|---|---|---|---|---|
| 7,599,980 B1* | 10/2009 | Rarick | ............... | G06F 7/5525 |
| | | | | 708/605 |
| 8,706,789 B2* | 4/2014 | Sperber | ............... | G06F 7/535 |
| | | | | 708/502 |
| 8,868,633 B2* | 10/2014 | Lemonds | ............... | G06F 1/03 |
| | | | | 708/605 |
| 2003/0145031 A1* | 7/2003 | Suzuki | ............... | G06F 7/48 |
| | | | | 708/524 |
| 2012/0079251 A1* | 3/2012 | Gradstein | ............... | G06F 9/30014 |
| | | | | 712/221 |
| 2013/0246496 A1* | 9/2013 | Craske | ............... | G06F 7/483 |
| | | | | 708/495 |
| 2015/0154023 A1 | 6/2015 | Macy, Jr. et al. | | |

* cited by examiner

METHODS FOR EXECUTING A COMPUTER INSTRUCTION AND APPARATUSES USING THE SAME

CROSS REFERENCE TO RELATED APPLICATIONS

This application claims the benefit of China Patent Application No. 201611081150.5, filed on Nov. 30, 2016, the entirety of which is incorporated by reference herein.

BACKGROUND

Technical Field

The present invention relates to microprocessor, and in particular, to methods for executing a computer instruction and apparatuses using the same.

Description of the Related Art

In the CPU (central processing unit) of a computer, machine instructions (also known as macro-instructions or computer instructions) are implemented by micro-operations (also known as μops). Usually, micro-operations perform basic operations on data stored in one or more registers, and the basic operations may include transferring data between registers or between registers and external buses of the CPU, and performing arithmetic operations or logical operations on data in registers. In a typical fetch-decode-execute cycle, a computer instruction is decomposed to generate a series of micro-operations, so that the CPU may determine to execute the series of micro-operations.

A computer instruction may be used to perform an arithmetic operation. As for the computer instruction performing complex arithmetic operations, such as a computer instruction with a packed operand, a decoding unit may translate the computer instruction into multiple micro-operations and sends the multiple micro-operations to an execution unit of a microprocessor to be executed. In a microprocessor capable of out-of-order execution, the executions of micro-operations are out-of-order, and it takes excessive time to complete all the micro-operations of the computer instruction. Therefore, what is needed are methods of executing a computer instruction and apparatuses using the same to optimize the execution of computer instructions.

BRIEF SUMMARY

An embodiment of the invention disclosures a method for executing a computer instruction, which may include the following steps: decoding the computer instruction to generate a micro-instruction including an opcode (operation code) and a packed operand, wherein the packed operand may include all n input parameters corresponding to the computer instruction; generating n addresses of the n input parameters according to the opcode and the packed operand; and reading n approximations corresponding to the n addresses from a lookup table.

An embodiment of the invention disclosures an apparatus for executing a computer instruction, which may include a DU (Decoding Unit), a ROM (Read-Only Memory), a ROM controller, an address generator and a controller. The DU may be configured to decode the computer instruction to generate a micro-instruction comprising an opcode and a packed operand, wherein the packed operand may comprise all n input parameters corresponding to the computer instruction. The ROM may be configured to store a lookup table and couple to the ROM controller. The address generator may be coupled to the ROM controller. The controller, coupled to the address generator, may be configured to direct the address generator to generate n addresses of the n input parameters according to the opcode and the packed operand and output the n addresses to the ROM controller. The ROM controller may be configured to read n approximations corresponding to the n addresses from the lookup table.

Methods and apparatuses for executing a computer instruction disclosed in the invention can improve the efficiency of executing computer instruction. As disclosed in the invention, a computer instruction comprising multiple input parameters may be decoded by a DU into a single micro-instruction, which may include a packed operand. When multiple input parameters are four SPFP (Single-Point Float-Point) values, the packed operand may comprise the four SPFP values, an EU (Execution Unit) may lookup four reciprocal approximations of the four SPFP values (or reciprocal approximations of square roots of the four SPFP values) and return a result of the four SPFP values, which may go through five stages or spend five cycles. Therefore, the execution efficiency of the computer instruction is dramatically improved.

A detailed description is given in the following embodiments with reference to the accompanying drawings.

BRIEF DESCRIPTION OF THE DRAWINGS

The present invention can be fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The scope of the invention is best determined by reference to the appended claims.

The present invention will be described with respect to particular embodiments and with reference to certain drawings, but the invention is not limited thereto and is only limited by the claims. It will be further understood that the terms "contains," "containing," "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

Figure 1:
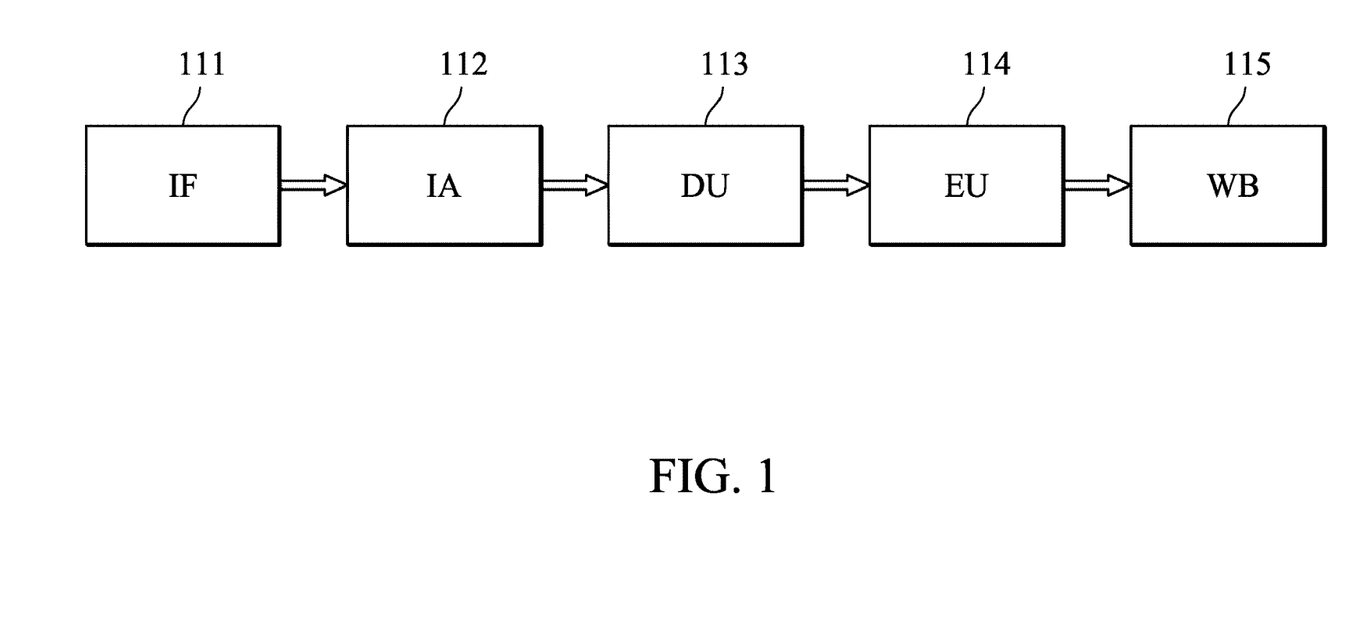
FIG. 1 is a block diagram of a pipe-stage RISC (Reduced instruction set computing) according to an embodiment of the present disclosure.

FIG. 1 is a block diagram of a pipe-stage RISC (Reduced instruction set computing) in accordance with an exemplary embodiment of the present disclosure. The system implementing the pipe-stage RISC may include an IF (Instruction Fetch) 111, an IA (Instruction Access) 112, a DU (Decode Unit) 113, an EU (Execution Unit) 114 and a WB (Write Back) 115. A PC (Program Counter, not shown herein) is configured to hold the address of the current instruction, and the PC may be implemented by a register. The IF 111 may read an address from the PC. The IA 112 may fetch one or more computer instructions (or macro-instructions) and their operands from an instruction cache according to the address. Each computer instruction may be used to perform a Boolean operation and/or an arithmetic operation for its operand. In some embodiments, the computer instruction may be used to calculate reciprocal approximation(s) of one or more values, or reciprocal approximation(s) of square root(s) of one or more values. In some embodiments, the values may be input parameters of a computer instruction (hereinafter referred to as input parameters), and the input parameters may be 32-bit SPFP (Single-Precision Float-Point) values and the computer instruction instructs calculations of reciprocal approximations (of square roots) of four SPFP values. In some embodiments, the input parameters may be 64-bit DPFP (Double-Precision Float-Point) values and the computer instruction instructs calculations of reciprocal approximations (of square roots) of two DPFP values. The input parameters may occupy storage space of 128 bits in total. The DU 113 may decode (or translate) the computer instruction to generate a micro-operation including an opcode (operation code) and its corresponding packed operand. In some embodiments, the DU 113 may include a translator for translating the computer instruction into the micro-operation. In some embodiments, the packed operand may include all n (e.g. 4 or 2) input parameters associated with the computer instruction. The EU 114 may read the packed operand of the micro-operation generated by the DU 113, generate n addresses corresponding to the all n input parameters according to the opcode, and read n approximations corresponding to the n addresses from a lookup table. For purposes of illustration, the EU 114 may divide the packed operand into n operands according to the opcode and obtain n values corresponding to n operands by searching the lookup table to acquire a result wherein the result corresponding to a value of the packed operand. In some embodiments, each operand indicates one of the n input parameters and the value of each operand may be a reciprocal approximation of this operand, or a reciprocal approximation of the square root of this operand. The WB 115 may write the result in a register. In some embodiments, the register may be a temporal register, such as a register file. In some embodiments, the computer instruction may be one instruction from reduced instruction set (RISC).

Figure 2:
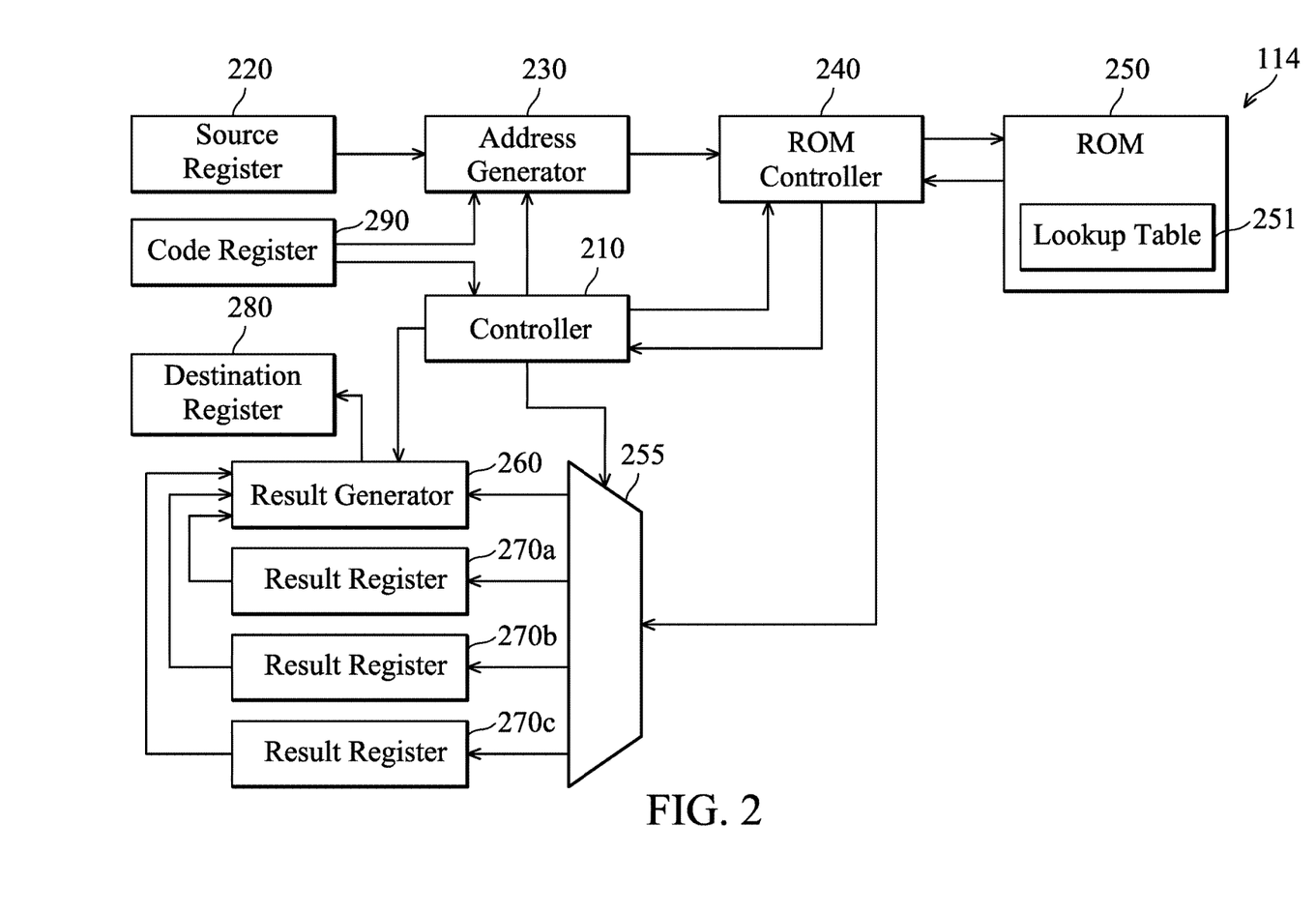
FIG. 2 is a block diagram of an EU (Execution Unit) for executing a micro-operation according to an embodiment of the disclosure.

FIG. 2 is a block diagram of an EU for executing a micro-operation according to an embodiment of the disclosure. The EU 114 may contain a controller 210, an address generator 230, a ROM (Read-Only Memory) controller 240 and a ROM 250. The ROM 250 may store a lookup table 251. An example of the lookup table 251 is shown in Table 1:

TABLE 1

| Address range | Stored data |
| --- | --- |
| 2'b1100000000-2'b1111111111 | Constants |
| 2'b1000000000-2'b1011111111 | Reciprocal approximations of values (of SPFP or DPFP) |
| 2'b0100000000-2'b0111111111 | Reciprocal approximations of square roots of values (of SPFP or DPFP) |
| 2'b0000000000-2'b0011111111 | Constants |

The lookup table 251 may be addressed in 10 bits and may store data of 1K bytes. For example, the memory space of addresses 2'b1000000000 to 2'b1011111111 stores reciprocal approximations of SPFP values and the memory space of addresses 2'b0100000000 to 2'b0111111111 stores reciprocal approximations of square roots of SPFP values. The lookup table 251 may be divided into segments, the significant bits are used to represent segment numbers, such as the $9^{th}$ bit and the $10^{th}$ bit. It should be understood that the described memory allocations for the reciprocal approximations of values and the reciprocal approximations of square roots of values are examples. Those skilled in the art may devise alternatives that depend on different design requirements and the invention should not be limited thereto. For example, the memory space of addresses 2'b0100000000 to 2'b0111111111 may store reciprocal approximations of values and the memory space of addresses 2'b1000000000 to 2'b1011111111 may store reciprocal approximations of square roots of values.

In some embodiments, after generating the micro-operation, the DU 113 may latch the opcode in a code register 290 and latch the packed operand in a source register 220. For example, the opcode "RCPPS" is an instruction to instruct to calculate reciprocal approximations of n (e.g. 4) input parameters corresponding to the packed operand and the output result contains SPFP values. The opcode "RSQRT" is an instruction to instruct to calculate reciprocal approximations of square roots of n (e.g. 4) input parameters corresponding to the packed operand and the output result contains SPFP values. The source register 220 may be a 128-bit register. The packed operand may be divided into four 32-bit operands and each operand may correspond to a 32-bit input parameter. For example, the DU 113 may predefine that bits $i_0$ to $i_0+7$ store a first input parameter corresponding to a first operand, where $i_0$ is an arbitrary value between 0 and 24; bits $i_1$ to $i_1+7$ store a second input parameter corresponding to a second operand, where $i_1$ is an arbitrary value between 32 and 56; bits $i_2$ to $i_2+7$ store a third input parameter corresponding to a third operand, where $i_2$ is an arbitrary value between 64 and 88; and bits $i_3$ to $i_3+7$ store a fourth input parameter corresponding to a fourth operand, where $i_3$ is an arbitrary value between 96 and 120. In one example, the contents of the code register 290 and the source register 220 may provide an instruction to calculate 1/100.5, 1/200.5, 1/300.5 and 1/400.5. In another example, the contents of the code register 290 and the source register 220 may provide an instruction to calculate $1/(100.5)^{1/2}$, $1/(200.5)^{1/2}$, $1/(300.5)^{1/2}$ and $1/(400.5)^{1/2}$.

In some embodiments, the controller 210 may drive the address generator 230 to generate four addresses according to the opcode and the operands and output the four addresses to the ROM controller 240, thereby enabling the ROM controller 240 to read four approximations corresponding to the four addresses from the lookup table 251 and output the four approximations to a result generator 260. In addition, the controller 210 may drive the result generator 260 to combine the four approximations to generate a result and latch the result in a destination register 280. In some embodiments, the controller 210 may drive the address generator 230 to generate four addresses according to the contents of the code register 290 and the source register 220, and output the four addresses to the ROM controller 240, thereby enabling the ROM controller 240 to read the content of the four addresses from the lookup table 251 accordingly and output the read content to a DEMUX (demultiplexer) 255. An input of the DEMUX 251 may connect to the ROM controller 240 and/or the ROM 250. Outputs of the DEMUX 251 may connect to one or more result registers 270a to 270c and/or the result generator 260. The address generator 230 may generate segment numbers and offsets of addresses according to the contents of the code register 290 and the source register 220. In some embodiments, the address generator 230 may generate segment numbers and offsets of addresses according to the opcode types and the operands of the micro-operations translated from the computer instructions. The controller 210 may control the DEMUX 255 to connect the ROM controller 240 to one of the result registers 270a to 270c and the result generator 260, thereby enabling one of them to receive the read content. In some embodiments, the result registers 270a to 270c are 32-bit registers.

Figure 3:
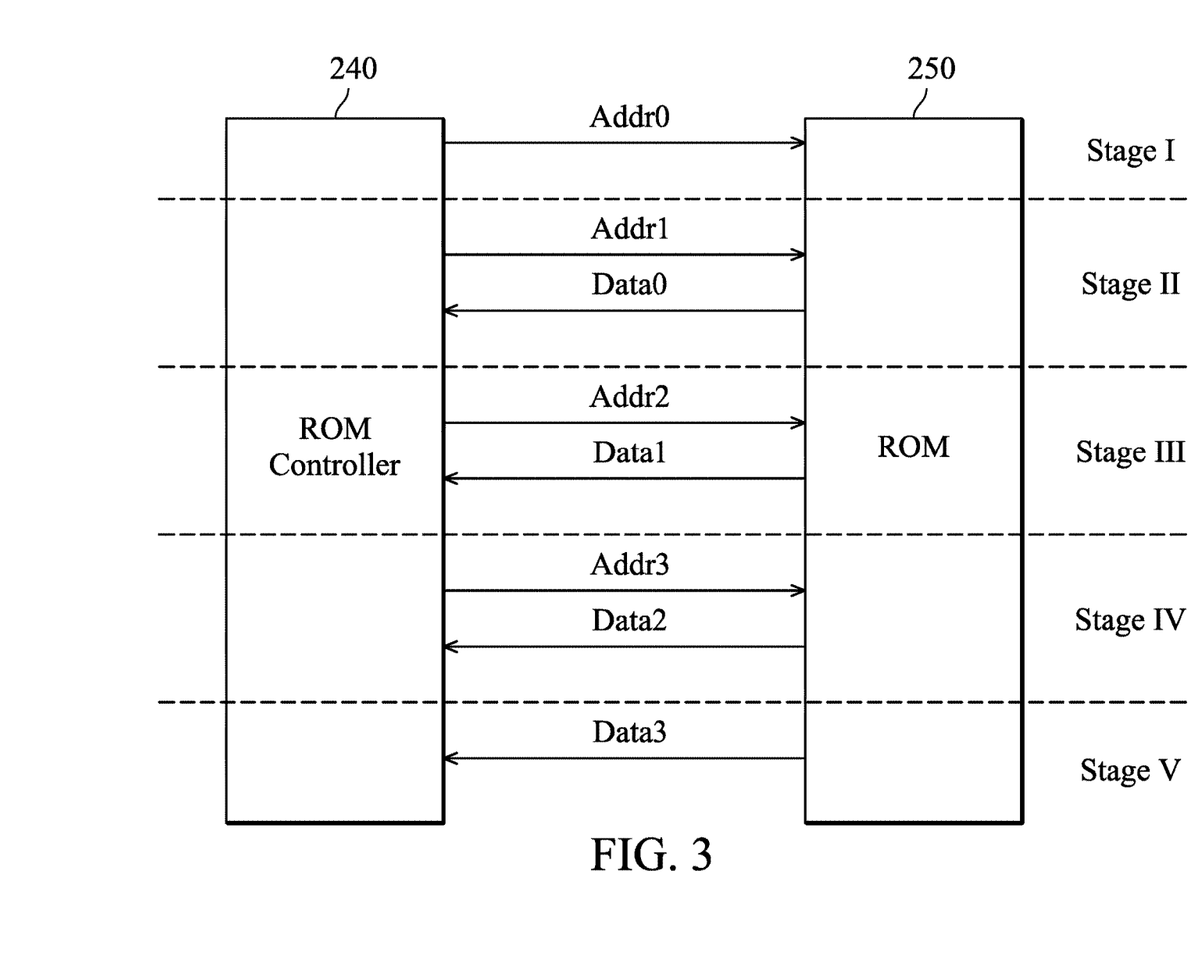
FIG. 3 is a schematic diagram of data flow between a ROM (Read-Only Memory) controller and a ROM according to an embodiment of the disclosure.

FIG. 3 is a schematic diagram of data flow between a ROM controller and a ROM according to an embodiment of the disclosure. Assume that data is transmitted between the ROM controller 240 and the ROM 250 through a data line. The ROM controller 240 may obtain reciprocal approximations (of square roots) of four input parameters through five stages, where the input parameters may be SPFP values. Addresses Addr0 to Addr3 may be generated by the address generator 230 according to the opcode of the code register 290 and the input parameters of the source register 220 or according to the opcode type and the operand of the micro-operation translated from the computer instructions. The address generator 230 may generate the addresses Addr0 to Addr3 simultaneously or sequentially. In stage I, the address generator 230 transmits the address Addr0 to the ROM controller 240. In some embodiments, the address Addr0="2'b10/01"+Scr[$i_0$:$i_0$+7], where Scr[$i_0$:$i_0$+7] indicates a value of bits $i_0$ to $i_0$+7 of the source register 220. For example, when the opcode is "RCPPS", the address Addr0="2'b10"+Scr[$i_0$:$i_0$+7]. When the opcode is "RSQRT", the address Addr0="2'b01"+Scr[$i_0$:$i_0$+7]. And the ROM controller 240 transmits the address Addr0 to the ROM 250. In stage II, the address generator 230 transmits the address Addr1 to the ROM controller 240. In some embodiments, the address Addr1="2'b10/01"+Scr[$i_1$:$i_1$+7], where Scr[$i_1$:$i_1$+7] indicates a value of bits $i_1$ to $i_1$+7 of the source register 220. The ROM controller 240 transmits the address Addr1 to the ROM 250 and receives an approximation Data0 corresponding to the address Addr0, which is found in the ROM 250. The ROM controller 240 outputs the approximation Data0 to the DEMUX 255 and transmits a message to the controller 210, indicating that the approximation Data0 of the address Addr0 has been output. The controller 210 controls the DEMUX 255 to connect the ROM controller 240 to the result register 270a for latching the approximation Data0. In stage III, the address generator 230 transmits the address Addr2 to the ROM controller 240. In some embodiments, the address Addr2="2'b10/01"+Scr[$i_2$:$i_2$+7], where Scr[$i_2$:$i_2$+7] indicates a value of bits $i_2$ to $i_2$+7 of the source register 220. The ROM controller 240 transmits the address Addr2 to the ROM 250 and receives an approximation Data1 corresponding to the address Addr1, which is found in the ROM 250. The ROM controller 240 outputs the approximation Data1 to the DEMUX 255 and transmits a message to the controller 210, indicating that the approximation Data1 of the address Addr1 has been output. The controller 210 controls the DEMUX 255 to connect the ROM controller 240 to the result register 270b for latching the approximate Data1. In stage IV, the address generator 230 transmits the address Addr3 to the ROM controller 240. In some embodiments, the address Addr3="2'b10/01"+Scr[$i_3$:$i_3$+7], where Scr[$i_3$:$i_3$+7] indicates a value of bits $i_2$ to $i_2$+7 of the source register 220. The ROM controller 240 transmits the address Addr3 to the ROM 250 and receives an approximation Data2 corresponding to the address Addr2, which is found in the ROM 250. The ROM controller 240 outputs the approximation Data2 to the DEMUX 255 and transmits a message to the controller 210, indicating that the approximation Data2 of the address Addr2 has been output. The controller 210 controls the DEMUX 255 to connect the ROM controller 240 to the result register 270c for latching the approximation Data2. In stage V, the ROM controller 240 receives an approximation Data3 corresponding to the address Addr3, which is found in the ROM 250. The ROM controller 240 outputs the approximation Data3 to the DEMUX 255 and transmits a message to the controller 210, indicating that the approximate Data3 of the address Addr3 has been output. The controller 210 controls the DEMUX 255 to connect the ROM controller 240 to the result generator 260 and instructs the result generator 260 to generate a result. The result generator 260 combines the approximation Data0 of the result register 270a, the approximation Data1 of the result register 270b, the approximation Data2 of the result register 270c and the approximation Data3 received from the ROM controller 240 to generate a 128-bit combined result and latches the 128-bit combined result in a destination register 280. In some embodiments, bits 0 to 31 of the destination register 280 may store a looked-up result of a first SPFP value, bits 32 to 63 of the destination register 280 may store a looked-up result of a second SPFP value, bits 64 to 95 of the destination register 280 may store a looked-up result of a third SPFP value and bits 96 to 127 of the destination register 280 may store a looked-up result of a fourth SPFP value. In some embodiments, the ROM 250 is equipped with four output ports for outputting the four approximations Data0, Data1, Data2 and Data3 to the DEMUX 255 in parallel. The DEMUX 255 outputs the four approximations to the result registers 270a to 270c and the result generator 260, respectively, and the result registers 270a to 270c output the three approximations to the result generator 260. The result generator 260 combines the four approximations into a result. In some other embodiments, the ROM 250 outputs the four approximations Data0, Data1, Data2 and Data3 to the DEMUX 255 in parallel. The DEMUX 255 outputs the four approximations to one or more result registers, for example, two result registers, and the result registers output the four approximations to the result generator 260. The result generator 260 combines the four approximations into a result.

Figure 4:
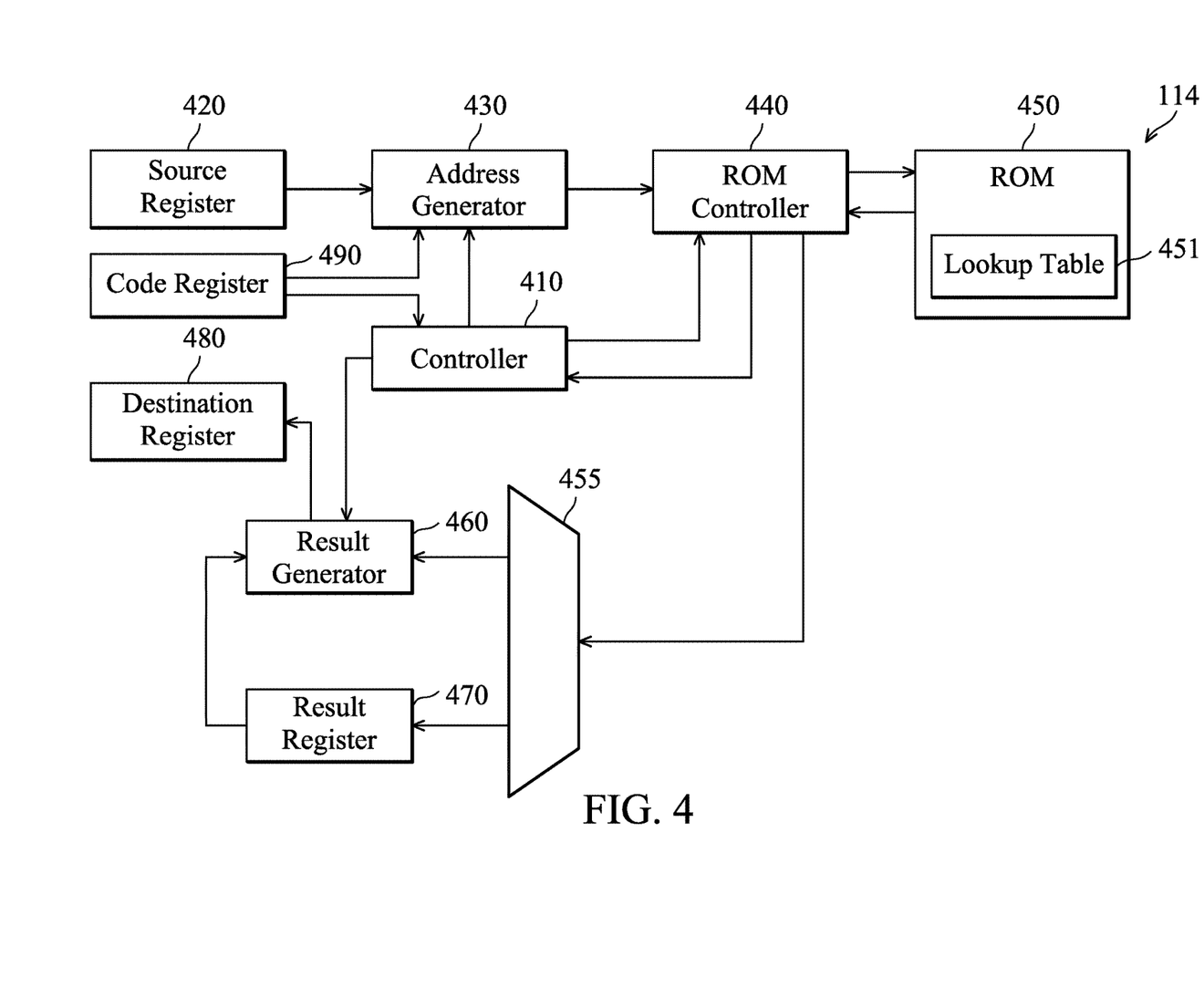
FIG. 4 is a block diagram of an EU for executing a micro-operation according to an embodiment of the disclosure.

FIG. 4 is a block diagram of an EU for executing a micro-operation according to an embodiment of the disclosure. The EU 114 may contain a ROM 450 for storing a lookup table 451. Those skilled in the art may devise the exemplary table 1 to allocate much more memory space to store reciprocal approximations of DPFP values. After generating a micro-operation, the DU 113 may latch the opcode in a code register 490 and latch the packed operand in a source register 420. For example, the opcode "DRCPPS" is an instruction to instruct to calculate reciprocal approximations of n (e.g. 2) input parameters corresponding to the packed operand and the output result may contain DPFP values. The opcode "DRSQRT" is an instruction to calculate reciprocal approximations of square roots of n (e.g. 2) input parameters corresponding to the packed operand and the output result contains DPFP values. The source register 420 may be a 128-bit register and segmented into two 64 bits and each segment stores an input parameter. In one example, the contents of the code register 490 and the source register 420 may provide an instruction to calculate 1/100.5 and 1/400.5. In another example, the contents of the code register 490 and the source register 420 may provide an instruction to calculate $1/(100.5)^{1/2}$ and $1/(400.5)^{1/2}$. The controller 410 directs the address generator 430 to generate two addresses according to the opcode and the packed-operand and output the generated addresses to the ROM controller 440, thereby enabling the ROM controller 440 to read two approximations corresponding to the two addresses from the lookup table 451. In some embodiments, the ROM 450 outputs the two approximations to the ROM controller 440, the ROM controller 450 outputs the two approximations to the DEMUX 455 and the DEMUX 455 outputs the two approximations to a result generator 460 for combining the two approximations to generate a result. In some other embodiments, the ROM 450 outputs the two approximations to the DEMUX 455 in parallel through its two output ports, the DEMUX 455 outputs the two approximations to a result register 470 and a result generator 460, the result register 470 outputs the latched approximation to the result generator 460 and the result generator combines the two approximations to generate a result.

The controller 410 may drive the result generator 460 to combine the two approximations to generate a result and latch the result in a destination register 480. In some embodiments, the controller 410 may drive the address generator 430 to generate two addresses and output the generated addresses to the ROM controller 440, thereby enabling the ROM controller 440 to read the content of the designated addresses from the lookup table 451. The address generator 430 may generate segment numbers and offsets of addresses according to the contents of the code register 490 and the source register 420. In some embodiments, the address generator 430 may generate segment numbers and offsets of addresses according to the opcode and the operands of the micro-operations translated from the computer instructions. An input of the DEMUX 451 may connect to the ROM controller 440 and outputs of the DEMUX 451 may connect the result registers 470 and the result generator 460, respectively. In some embodiments, the result registers 470 and the result generator 460 connected to the DEMUX 451 may be configured to receive the contents of designated addresses of the look-up table 451. The controller 410 controls the DEMUX 455 to connect the ROM controller 440 to one of the result register 470 and the result generator 460, thereby enabling the read data to be sent to the connected component, where the result register 470 is a 64-bit register.

Figure 5:
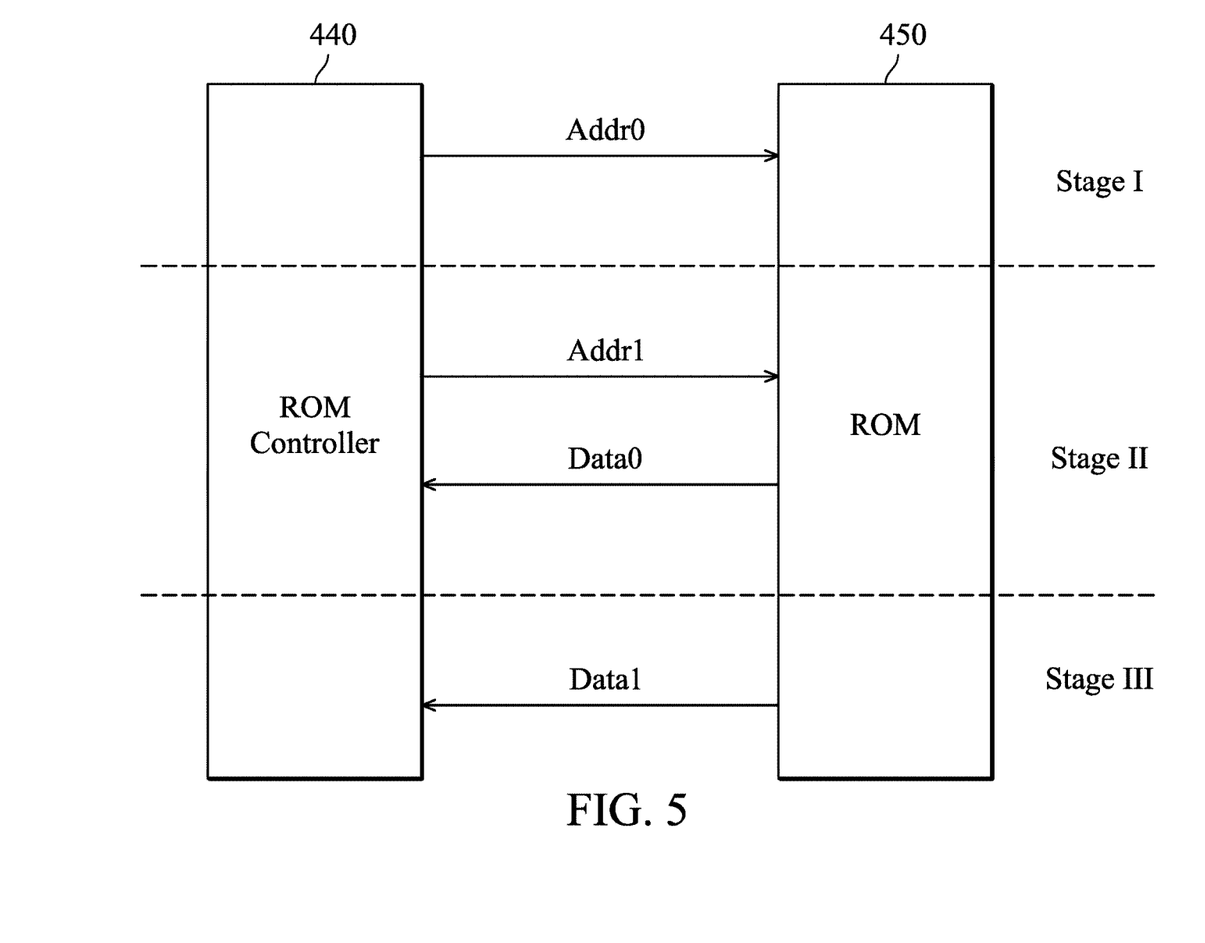
FIG. 5 is a schematic diagram of data flow between a ROM controller and a ROM according to an embodiment of the disclosure.

FIG. 5 is a schematic diagram of data flow between a ROM controller and a ROM according to an embodiment of the disclosure. In some embodiments, data is transmitted between the ROM controller 440 and the ROM 450 through a data line. The ROM controller 440 may obtain reciprocal approximations (of square roots) of two input parameters through three stages, where the input parameters may be DPFP values. Addresses Addr0 and Addr1 may be generated by the address generator 430 according to the opcode of the code register 490 and the input parameters of the source register 420 or according to the opcode type and the operand of the micro-operation translated from the computer instructions. The address generator 430 may generate the addresses Addr0 to Addr1 simultaneously or sequentially. In stage I, the address generator 430 transmits the address Addr0 to the ROM controller 440. The ROM controller 440 transmits the address Addr0 to the ROM 450. In stage II, the address generator 430 transmits the address Addr1 to the ROM controller 440. The ROM controller 440 transmits the address Addr1 to the ROM 450 and receives an approximation Data0 corresponding to the address Addr0, which is found in the ROM 450. The ROM controller 440 outputs the approximation Data0 to the DEMUX 455 and transmits a message to the controller 410, indicating that the approximation Data0 corresponding to the address Addr0 has been output. The approximation Data0 corresponding to the address Addr0 is obtained by searching data of the lookup table 451 of the ROM 450. The controller 410 controls the DEMUX 455 to connect the ROM controller 440 to the result register 470 for latching the approximation Data0. In stage III, the ROM controller 440 receives an approximation Data1 corresponding to the address Addr1, which is found in the ROM 450. The ROM controller 440 outputs the approximation Data1 to the DEMUX 455 and transmits a message to the controller 410, indicating that the approximation Data1 of the address Addr1 has been output. The controller 410 controls the DEMUX 455 to connect the ROM controller 440 to the result generator 460 and instructs the result generator 460 to generate a result. The result generator 460 combines the approximation Data0 of the result register 470 and the approximation Data1 received from the ROM controller 440 to generate a combined 128-bit combined result and latches the 128-bit combined result in a destination register 480. In some embodiments, bits 0 to 63 of the destination register 480 may store a looked-up result of a first DPFP value, bits 64 to 127 of the destination register 480 may store a looked-up result of a second DPFP value.

Figure 6:
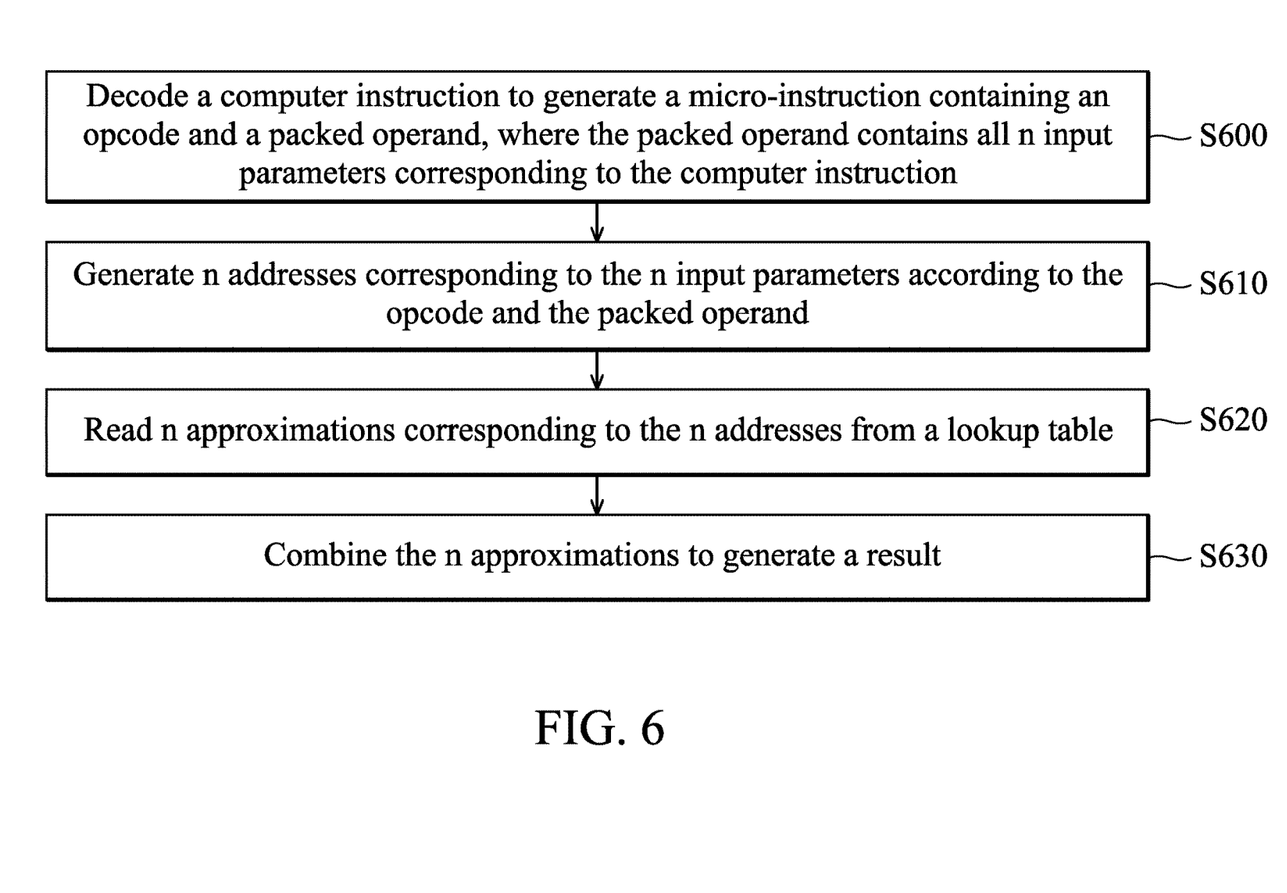
FIG. 6 is a flowchart of a method for executing a computer instruction according to an embodiment of the disclosure.

FIG. 6 is a flowchart of a method for executing a computer instruction according to an embodiment of the disclosure. In step S600, a computer instruction is decoded to generate a micro-instruction containing an opcode and a packed operand, where the packed operand contains all n input parameters corresponding to the computer instruction. In some embodiments, the opcode and the packed operand generated in step S600 are latched in the code register 290 or 490 and the source register 220 or 420, respectively. In step S610, n addresses corresponding to the n input parameters are generated according to the opcode and the packed operand. In some embodiments, the opcode and the packed operand are from the code register 290 or 490 and the source register 220 or 420. In some embodiments, each of the n addresses contains a segment number and an offset. For the purposes of illustration, for each input parameter, the segment number of the address is determined according to the opcode of the code register 290 or 490 and the offset of the address is determined according to one input parameter of the source register 220 or 420. In step S620, n approximations corresponding to the n addresses are read from the lookup table 251 or 451. In some embodiments, the approximations may be reciprocal approximations of the values of input parameters or reciprocal approximations of square roots of the values of input parameters. The approximations may be SPFP or DPFP values. In some embodiments, the approximations may be output to the result generator 260 or 460 in parallel. For the purposes of illustration, the approximations are looked-up from the ROM 250 or 450 or from the lookup table 251 or 451 through the ROM controller 240 or 440 and output to a result register (such as the result register 270a, 270b, 270c or 470) and a result generator (such as the result generator 260 or 460) in parallel. In some embodiments, the approximations are output to the result generator 260 or 460 sequentially. For the purposes of illustration, each approximation is looked-up from the ROM 250 or 450 or from the lookup table 251 or 451, output to a DEMUX (such as the DEMUX 255 or 455) through the ROM controller 240 or 440, and output to a result register (such as the result register 270a, 270b, 270c or 470) or a result generator (such as the result generator 260 or 460) through DEMUX (such as the DEMUX 255 or 455), which may be controlled by the controller (such as the controller 210 or 410). In step S630, the n approximations are combined to generate a result. In some embodiments, the result is latched in a register, such as the destination register 280 or 480. In some embodiments, n is 4, the opcode provides instructions to calculate reciprocal approximations (of square roots) of the n values and the approximations are SPFP values. In some embodiments, n is 2, the opcode provides instructions to calculate reciprocal approximations (of square roots) of the n values and the approximations are DPFP values.

Methods and apparatuses for executing a computer instruction disclosed in the disclosure can improve the execution efficiency. Typically, a computer instruction containing multiple input parameters is decoded into multiple micro-instructions. For example, when the input parameters are four SPFP values, the computer instruction is decoded into three micro-instructions, at least seven stages (or clock cycles) may be taken to complete the look-ups for four reciprocal approximations (of square roots) of the four SPFP values and return a result. In addition, in an OOO (Out of Order) microprocessor, an EU may not execute the three micro-instructions continuously and may be interrupted by another micro-instruction(s), resulting in much longer time being required to execute the computer instruction. In the invention, a computer instruction containing multiple input parameters is decoded by a DU into a single micro-instruction containing a packed operand. When the packed operand contains four SPFP values, an EU completes the look-ups for four reciprocal approximations (of square roots) of the four SPFP values and returns a result through five stages. Therefore, the execution efficiency of this sort of computer instruction is dramatically improved.

Although the embodiment has been described as having specific elements in FIGS. 2 and 4, it should be noted that additional elements may be included to achieve better performance without departing from the spirit of the invention. While the processing flow described in FIG. 6 includes a number of operations that appear to occur in a specific order, it should be apparent that those skilled in the art can modify the order to achieve the same objectives. Thus, the invention should not be limited to the specific order. In addition, process steps of FIG. 6 may be realized in the hardware components as shown in FIG. 2 or 4, or by using software.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for executing a computer instruction, comprising:
    decoding the computer instruction to generate a micro-instruction comprising an opcode (operation code) and a packed operand, wherein the packed operand comprises all n input parameters corresponding to the computer instruction;
    generating n addresses of the n input parameters according to the opcode and the packed operand; and
    reading n approximations corresponding to the n addresses from a lookup table;
    wherein n is an integer greater than 1.

2. The method of claim 1, wherein the opcode is obtained from a code register and the packed operand is obtained from a source register.

3. The method of claim 1, wherein the step for generating n addresses of the n input parameters according to the opcode and the packed operand comprises:
    for each input parameter, determining a segment number of the corresponding address according to the opcode and determining an offset of the corresponding address according to the input parameter.

4. The method of claim 1, wherein n is 4 and the input parameters are SPFP (Single-Precision Float-Point) values, or n is 2 and the input parameters are DPFP (Double-Precision Float-Point) values.

5. The method of claim 1, wherein the opcode indicate to calculate reciprocals of the n input parameters or reciprocals of square roots of the n input parameters.

6. The method of claim 1, further comprising:
    combining the n approximations to generate a result of the micro-operation; and
    latching the result in a destination register.

7. The method of claim 1, wherein the n approximations are output through n outputs of the lookup table in parallel.

8. The method of claim 1, wherein the n approximations are output through the lookup table sequentially.

9. The method of claim 1, wherein the step for reading n approximations corresponding to the n addresses from the lookup table comprising:
    transmitting the n addresses to the lookup table sequentially; and
    receiving the n approximations from the lookup table sequentially,
    wherein the transmitting and the receiving may be performed n times to form a pipeline operation.

10. The method of claim 1, wherein the lookup table is in an EU (Execution Unit) of a microprocessor.

11. An apparatus for executing a computer instruction, comprising:
    a DU (Decoding Unit), decoding the computer instruction to generate a micro-instruction comprising an opcode (operation code) and a packed operand, wherein the packed operand comprises all n input parameters corresponding to the computer instruction;
    a ROM (Read-Only Memory), storing a lookup table;
    a ROM controller, coupled to the ROM;
    an address generator, coupled to the ROM controller; and
    a controller, coupled to the address generator,
    wherein the controller directs the address generator to generate n addresses of the n input parameters according to the opcode and the packed operand and output the n addresses to the ROM controller, and the ROM controller reads n approximations corresponding to the n addresses from the lookup table;
    wherein n is an integer greater than 1.

12. The apparatus of claim 11, comprising a code register and a source register, wherein the opcode is obtained from the code register and the packed operand is obtained from the source register.

13. The apparatus of claim 11, comprising a result generator and a destination register, wherein the result generator combines the n approximations to generate a result of the micro-operation and the destination register latches the result.

14. The apparatus of claim 11, wherein the ROM is connected to a DEMUX (De-Multiplexer) and the n approximations are output from the DEMUX in parallel.

15. The apparatus of claim 11, wherein the ROM is connected to a DEMUX (De-Multiplexer) and the n approximations are output from the DEMUX sequentially.

16. The apparatus of claim 15, wherein the DEMUX is connected to a plurality of result registers.

17. The apparatus of claim 11, wherein the opcode indicate to calculate reciprocals of the n input parameters or reciprocals of square roots of the n input parameters.

18. The apparatus of claim 11, wherein the address generator determines a segment number of each address according to the opcode and determines n offsets of the n addresses according to the n input parameters.

19. The apparatus of claim 11, wherein n is 4 and the input parameters are SPFP (Single-Precision Float-Point) values, or n is 2 and the input parameters are DPFP (Double-Precision Float-Point) values.

20. The apparatus of claim 11, wherein the ROM controller, the ROM, the controller and the address generator are integrated in an EU (Execution Unit) of a microprocessor.

* * * * *